June 25, 1963  W. H. ABILDGAARD  3,094,704
PLASTIC GLOVE
Original Filed Aug. 5, 1957  2 Sheets-Sheet 1
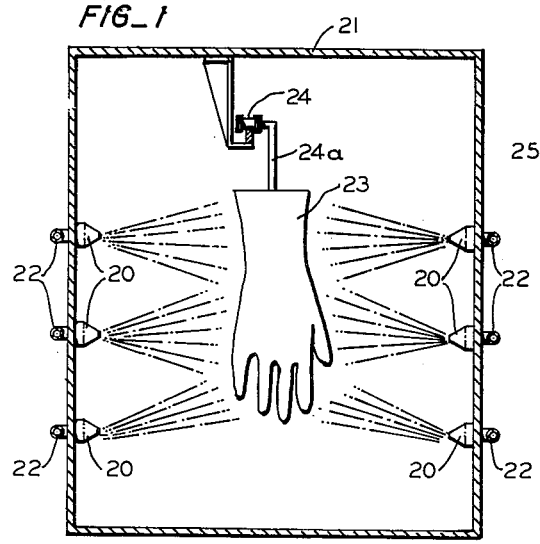
FIG_1
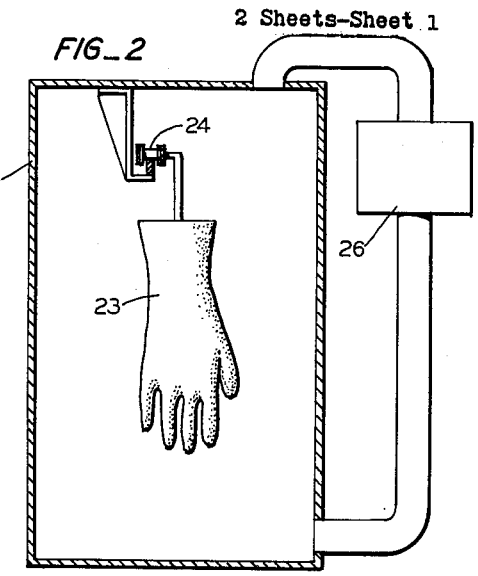
FIG_2
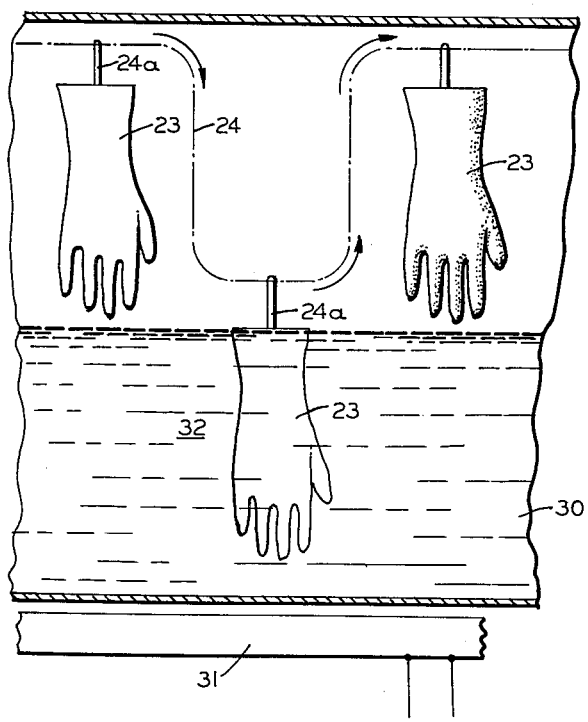
FIG_4
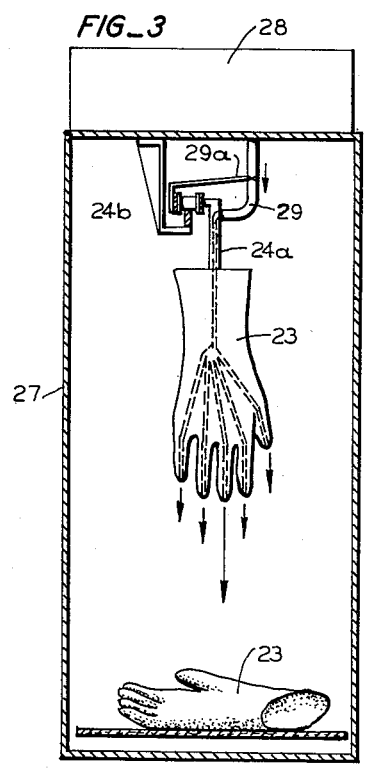
FIG_3
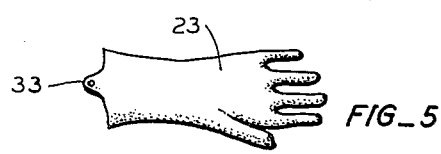
FIG_5
INVENTOR.
WILLIAM H. ABILDGAARD
BY
Allen and Chromy
ATTORNEYS June 25, 1963   W. H. ABILDGAARD   3,094,704
PLASTIC GLOVE
Original Filed Aug. 5, 1957   2 Sheets-Sheet 2
FIG_6
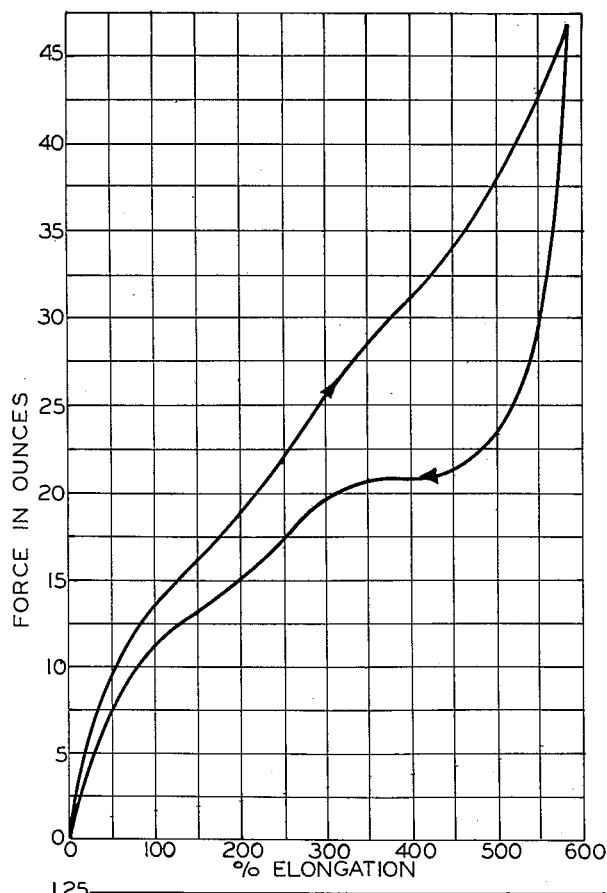
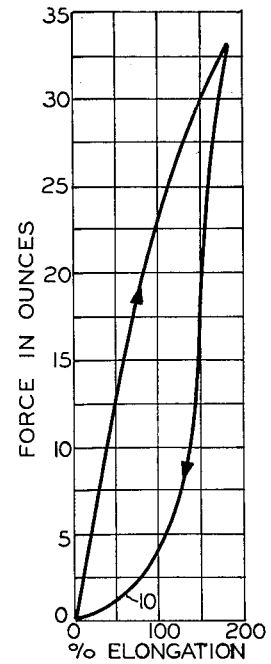
FIG_7
FIG_8
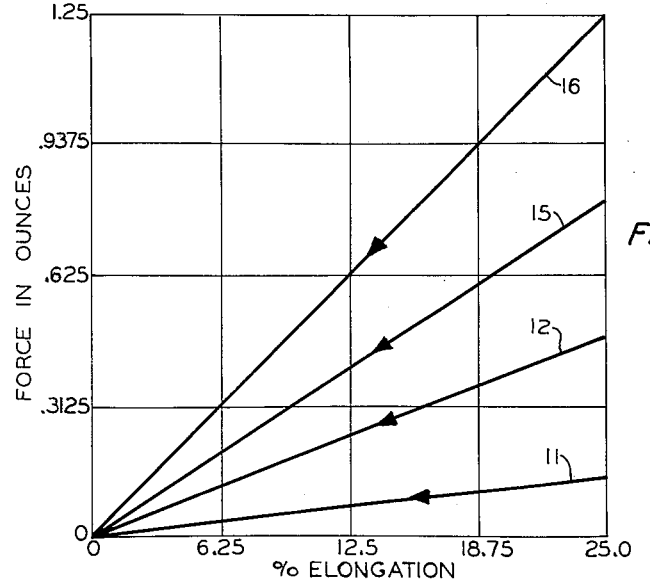
INVENTOR.
WILLIAM H. ABILDGAARD
BY
ATTORNEYS United States Patent Office 3,094,704
Patented June 25, 1963

3,094,704
PLASTIC GLOVE
William H. Abildgaard, Sunnyvale, Calif., assignor to Plastomeric Products Corporation, San Jose, Calif., a Corporation of California
Continuation of application Ser. No. 676,351, Aug. 5, 1957. This application Sept. 29, 1960, Ser. No. 59,323
3 Claims. (Cl. 2—167)

This application is a continuation of my co-pending application No. 676,351, filed August 5, 1957, for Plastic Glove, now abandoned.

This invention relates to gloves made of plastic adapted especially for use by physicians and surgeons.

An object of this invention is to provide an improved substantially skin fitting glove of plastic material adapted for use by surgeons and others.

Another object of this invention is to provide a method of manufacturing surgeons' gloves made of inexpensive material so that they may be discarded after use thereof in an operation.

Still another object of this invention is to provide a glove made of inexpensive plastic material so that it may be discarded after it is soiled or contaminated, thus making it unnecessary to subject it to expensive cleaning and sterilizing processes.

A further object of this invention is to provide an improved glove of inexpensive plastic material that has sufficient strength so that it may be made extremely thin and the glove does not hinder the performance of delicate work by the wearer.

Another object of the invention is to provide a glove formed of an elastomer layer of the desired thickness and resilience for surgeons' and physicians' use.

Other and further objects of this invention will be apparent to those skilled in the art to which it relates.

In accordance with this invention there is provided a glove made of plastic material that is comparatively inexpensive so that the glove may be discarded after it is soiled or contaminated, thereby eliminating expensive cleaning and sterilization operations. The glove of this invention is particularly adapted to be worn by physicians and surgeons. Accordingly, this invention provides an inexpensive substitute for the comparatively expensive gloves heretofore used and it also decreases the danger of spreading diseases.

Other and further features of this invention will be apparent to those skilled in the art to which it relates from the following specification, claims and drawing in which briefly:

FIG. 1 is a view showing the spraying of molten plastic or plastic solution on the glove form;

FIG. 2 is a view showing the drying or curing of the plastic material on the glove form;

FIG. 3 is a view showing removal of the plastic glove from the form;

FIG. 4 is a view showing manufacture of plastic gloves by dipping;

FIG. 5 is a view showing a plastic glove made in accordance with this invention; and FIGURES 6, 7 and 8 illustrate various stress-strain curves of elastomer layer one inch square, the readings being taken on a Dillon test machine with a speed of 1"/minute.

The provision of a satisfactory plastic glove for use by physicians and surgeons, including both gloves worn for examination and for surgery, presents a difficult problem. As a result of my practice as a physician, I have discovered that the glove must be such that it will not impair the functions of the hand, namely the tactile function of touch, the sensing of temperature, and the dexterity in use of the various muscles. I have also found that all these functions are impaired by the conventional rubber glove, or by a plastic glove made in improper fashion so as to be too thick or too resilient. Also, the glove must be such that it will not impair circulation in the hand or wrist because impaired circulation affects first the touch or tactile sense of a hand, then next affects the sensitivity of the hand to heat and cold, and in fact, will begin to produce numbness in the average individual after wearing for about one-half hour, and if wearing is continued, actual pain will occur due to interference with the capillary circulation of the skin. These impairments which are present in conventional gloves are due primarily to the high snap-back or high elastic memory of materials used in fabricating the glove.

I have discovered that a satisfactory and efficient plastic glove can be made from elastomers by controlling certain physical characteristics of the glove, namely, thickness and resilience or elastic memory. In producing surgeons' and physicians' gloves, the glove is made slightly smaller than the hand of the wearer so that it will be stretched when placed on the hand to obtain a snug fit. Referring to FIG. 6 which shows a stress-train curve for a latex layer of .008 inch thick, it will be seen that throughout the curve the force in ounces to effect stretching (as shown on the upper half of the curve) does not vary greatly from the resilience or the force available (as shown on the lower half of the curve) for returning the layer to the original shape. In other words, in the portion of the curve affecting gloves (below 100% elongation) there is no great percentage difference between the stretching force and the resiliency.

Referring to FIG. 7 there is shown a stress-strain curve for a suitable elastomer layer of .005 inch thickness and it will be noted that in the range up to 100% elongation there is a substantial difference in the ordinates of the outgoing half of the curve from the incoming half of the curve thereby defining the slow-to-recover characteristics desirable in an elastomer layer used in producing a glove. FIG. 8 is in part an enlarged portion of FIG. 7 and shows a family of curves corresponding to the lower half of FIG. 7 and illustrating the resilience or stress energy which may be recovered from a stretched elastomer membrane of varying thicknesses. The bottom line 11 corresponds to a 1 mil thickness, the line 12 corresponding to 3 mils thickness, the line 15 to 5 mils thickness and the line 16 to 8 mils thickness. The line 16 represents approximately the highest desirable thickness of an elastomer to obtain the desired slow-to-recover characteristics with the necessary strength for a glove.

A plastic glove produced in accordance with the characteristics of the FIG. 8 family of curves of resilience of an elastomer layer having slow-to-recover characteristics and produced in the configuration of the wearer's hand will be sufficiently thin, soft and pliable so that the textures of the surfaces on which the physician or surgeon is working may be readily felt therethrough. Also, after a glove is placed on the hand and is stretched to fit, it will place a substantially neligible force in restricting the hand so that it will not impair the functions of the hand as to touch, as to sensing temperature or as to dexterity.

I have discovered that a glove constructed and fabricated to the above formula of vinyl provides a desirable relation of flexibility to temperature in that the glove may have less flexibility at the time that it is put on than is desirable, but due to the heat of the hand, will acquire the desired flexibility and mold itself to the hand so it can fit properly but does not interfere with the use of the hand in any of its functions over an extended period of time. In fact, a glove formed in the proper manner with the proper characteristics as defined herein has a high transmissiveness and will transmit an outline impressed on one side of a layer to the other side, for example, so as to permit the taking of fingerprints of an individual wearing the glove. This is an illustration of the close fitting but non-confining characteristics of the glove which provides for accommodation to the irregularities, however minute, of the hand, and for sensing of irregularities or shape of an object felt through the glove.

The plastic gloves made in accordance with this invention may be produced by spraying plastic material which may be either molten or dissolved in a suitable solvent, upon a plurality of molds or forms simultaneously, one such form 23 being shown in FIG. 1. In this process a plurality of spray nozzles 20 are positioned on the inner sides of the chamber 21. These spray nozzles 20 are connected to suitable pipes 22 which are in turn connected to a supply reservoir or autoclave holding the plastic solution or melt from which the plastic material is supplied to the nozzles 20 under suitable pressure. The nozzles 20 are oriented so that a thin coating of plastic is sprayed over the whole surface of the glove form 23, which is suspended from the conveyor 24, as this form is moved past the nozzles 20.

A plurality of these forms 23, which have the general configuration of a person's hand, may be suspended from the conveyor 24 so that the spraying thereof may be continuous, that is, one form may be sprayed after the other or several forms may be sprayed simultaneously. After the form 23 is coated with plastic, the conveyor 24 moves it into another chamber 25, which is positioned adjacent to the chamber 21 and this chamber may be kept at a suitable temperature to evaporate the solvent and monomer from the plastic coating and to cure said coating adhering to the form 23.

The solvent monomer and other material given off by the plastic material is exhausted from the chamber 25 by means of a suitable exhaust and condenser mechanism 26 that is connected to the top and bottom of the chamber 25 so that the atmosphere from said chamber may be drawn through the mechanism 26 and filtered. After the plastic glove is processed in the chamber 25, it is carried by the glove carrying form 23 to the chamber 27 that is provided with a source of compressed air 28 which is provided with a pipe 29 that supplies a jet of compressed air to the glove form support for removing the plastic glove therefrom. The compressed air jet is supplied to the tubular support 24a when the nozzle on the pipe 29 is in alignment with a small hole near the top of the support 24a, leading to the tubulation in this support. At this alignment the conveyor 24 actuates a leverage 24b that opens the valve 29a to release the air jet. The form 23 may be provided with a plurality of small perforations so that the compressed air supplied to the inside of the form may pass therefrom and loosen the glove from the form. The gloves removed from the forms 23 are dropped one after another upon the conveyor 29, which conveys them to suitable packaging apparatus.

The plastic gloves made in accordance with this invention may be made by dipping the glove form 23 into a plastic melt or a plastic solution 32 instead of spraying the plastic upon the form as previously described. This modified process employs a vat 30 in which the plastic melt or solution is placed. If a plastic melt is employed, then a suitable heater 31, which may be an electric heater, is used to heat the plastic melt 32 in the vat 30. On the other hand, if a plastic solution is employed, then the heater 31 may not be necessary. The glove form 32 is conveyed by the conveyor 24 into the chamber surrounding the vat 30, and this glove form is momentarily immersed into the melt or solution 32 to receive a thin coating of plastic solution or melt. It is withdrawn from this solution or melt and then passed into the chamber 25 where the solvent or monomer given off by the plastic coating on the glove form 23 is exhausted from the chamber 25 by means of the exhaust apparatus and condenser 26. For this purpose the atmosphere in the chamber 25 may be maintained higher than room temperature. After the plastic glove is suitably set or cured on the form 23, it is passed by the conveyor 24 into the glove removing chamber 27 and the plastic glove is removed from the form 23 as previously described.

The glove form 23 may be made of a material that is adapted to expand a certain amount, such as neoprene rubber, which is adapted to be expanded by the compressed air supplied thereto in the chamber 27. This expansion may take place simultaneously as a certain amount of compressed air is permitted to pass from the inside of the form 23 into the plastic glove deposited thereon so that simultaneously as the glove is removed from the form 23, the glove is stretched a certain amount. This stretching need not be to the full amount permitted by the plastic glove inasmuch as a certain amount of stretch may be permitted to remain in the glove until it is placed into use by the physician or surgeon. In this way the glove makes a very snug fit on the physician's or surgeon's hand.

The glove of this invention may be made of various elastomer or plastic materials providing a layer or film of the above-identified desired thickness and resilience, such as homo-polymers of polyvinyl chlorides, polyvinyl chloride acetates and co-polymers of vinyl chloride with acro-nitriles, vinylidene chlorides. Polyether and polyester urethanes may also be used. Also the above materials may be used with rubber polymers as fillers, and with other conventional film ploymers which are co-polymers thereof.

The plastic glove of this invention is such as to fit the general configuration of a person's hand in a skin tight manner, and the film forming the glove is sufficiently thin, soft and pliable so that textures of surfaces may be readily felt therethrough. On the other hand the plastic film is impervious to moisture and is also highly resistant to tearing or rupturing so that it affords adequate protection when used by physician and surgeons in the performance of operations.

In FIG. 5 there is shown a plastic glove made in accordance with this invention, to which the apertured tab 33 is attached. This tab is preferably positioned at the open end of the glove and on the palm side thereof and it may be made integral with the glove. This tab may be made at the same time as the glove is produced by spraying or dipping by providing a suitable tab at the upper end of the glove form in FIGURES 1, 2, 3 and 4, so that the plastic material is also deposited on this tab of the form. This tab is provided with a suitable aperture so that the gloves may be hung on a suitable support. This aperture may also be formed during the spraying or dipping process by providing a suitable projection to the tab form corresponding to the aperture, on which the plastic material is not deposited so as to leave an aperture on the tab corresponding to this projection. In addition to functioning as a suport for the glove, this tab also facilitates the application of the glove to the surgeon's or physician's hand.

While I have shown a preferred embodiment of the invention it will be understood that the invention is capable of variation and modification from the form shown so that its scope should be limited only by the scope of the claims appended hereto.

What I claim is:

1. A seamless plastic glove adapted for use of physicians or surgeons comprising a skin-fitting form-molded plastic layer made from an elastomer having slow-to-recover characteristics after stretching, and having the configuration of the wearer's hand, and being sufficiently thin, soft and pliable so the textures of surfaces on which the physician or surgeon is working may be readily felt therethrough and so as not to hamper the performance of delicate work by the wearer, said form-molded plastic glove being impervious to moisture and also being highly resistant to tearing or rupturing, in which the resilience or stress energy which may be recovered from the deformed glove after stretching thereof in placing on the hand is expressed by the curves in FIG. 8, whereby the resilience or stress energy is sufficiently low to avoid blanching or interference with the capillary circulation of the skin.

2. A seamless plastic glove adapted for use of physicians or surgeons comprising a skin-fitting form-molded plastic layer made from an elastomer having slow-to-recover characteristics after stretching, and having the configuration of the wearer's hand, and being sufficiently thin, soft and pliable so the textures of surfaces on which the physician or surgeon is working may be readily felt therethrough and so as not to hamper the performance of delicate work by the wearer, said form-molded plastic gloove being impervious to moisture and also being highly resistant to tearing or rupturing, in which the stress energy which may be recovered from the deformed glove after stretching thereof in placing on the hand is at least sufficient to provide an approximate fit on the hand of a physician or surgeon and does not exceed about 1.25 ozs. per square inch at 25% elongation.

3. A seamless plastic glove adapted for use of physicians or surgeons comprising a skin-fitting form-molded plastic layer made from an elastomer having slow-to-recover characteristics after stretching, and having the configuration of the wearer's hand, and being sufficiently thin, soft and pliable so the textures of surfaces on which the physician or surgeon is working may be readily felt therethrough and so as not to hamper the performance of delicate work by the wearer, said form-molded plastic glove being impervious to moisture and also being highly resistant to tearing or rupturing, in which the thinness dimension does not exceed about .008 inch and in which the recoverable stress energy or resilience does not exceed about 1.25 ozs. per square inch at 25% elongation.

References Cited in the file of this patent

UNITED STATES PATENTS

| | | |
|---|---|---|
| 1,097,018 | Hadfield | May 19, 1914 |
| 2,335,871 | Milligan | Dec. 7, 1943 |
| 2,670,473 | Stebic | Mar. 2, 1954 |
| 2,683,263 | Lenhart | July 13, 1954 |
| 2,773,264 | Nover | Dec. 11, 1956 |
| 2,847,676 | Scott | Aug. 19, 1958 |